United States Patent
Bates et al.

(10) Patent No.: US 6,452,617 B1
(45) Date of Patent: Sep. 17, 2002

(54) ADJUSTING A CLICK TIME THRESHOLD FOR A GRAPHICAL USER INTERFACE

(75) Inventors: Cary Lee Bates; Paul Reuben Day; John Matthew Santosuosso, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,229

(22) Filed: Jan. 10, 2000

(51) Int. Cl.[7] .............................................. G06F 13/00
(52) U.S. Cl. ...................................... 345/856; 345/744
(58) Field of Search ................................ 345/707, 708, 345/744, 743, 812, 831, 856, 163

(56) References Cited

U.S. PATENT DOCUMENTS

| 5,018,082 A | | 5/1991 | Obata et al. | |
| 5,559,943 A | | 9/1996 | Cyr et al. | |
| 5,611,040 A | * | 3/1997 | Brewer et al. | 345/781 |
| 5,786,818 A | * | 7/1998 | Brewer et al. | 345/822 |

OTHER PUBLICATIONS

Microsoft WIndows NT. 1999.*

* cited by examiner

Primary Examiner—John Cabeca
Assistant Examiner—Reginald Riley, Jr.
(74) Attorney, Agent, or Firm—Wood, Herron & Evans LLP (57) ABSTRACT

An apparatus, program product, and method dynamically adjust a click time threshold for recognizing subsequent click events on a graphical user interface in response to a user interacting with an application with a click event. More specifically, the actuations of a button of a user-manipulated pointing device are monitored. A click event is posted for the application when a predetermined number of button clicks occur within a click time threshold. In addition to this user interaction with the application, advantageously a duration of the predetermined number of button clicks is determined. Then, the click time threshold is adjusted responsive to the duration of the predetermined number of button clicks. Consequently, adjustment of click event recognition is dynamically made while the user interacts with an application that is not solely directed toward customizing the recognition of click events. In addition, the button monitoring may initialize its default click time threshold in response to stored historical usage by the user, a default for an application executed on the computer system (i.e., a child's game application may default to a longer click time threshold than a business software application), and/or user control selection on the graphical user interface.

21 Claims, 4 Drawing Sheets

ADJUSTING A CLICK TIME THRESHOLD FOR A GRAPHICAL USER INTERFACE

FIELD OF THE INVENTION

The invention is generally related to computer systems and graphical user interface environments therefor. More particularly, the invention is related to the control of user-manipulated pointing devices in a graphical user interface environment.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUIs), which permitted end users to interact with computers through the more intuitive operations of "pointing and clicking" on graphical display elements with a pointer controlled by a mouse or other user interface device. When pointing and clicking, a user typically directs a graphical pointer over an object by moving the mouse, and then indicates a desire to interact with that object by depressing a button on the user interface device.

Providing additional functions with a pointing device (e.g., mouse, trackball, joystick, touch pad, touch screen) generally requires having a plurality of buttons on the pointing device, using the keyboard in combination with or to the exclusion of the pointing device, or repetitively depressing a specific button. One common approach is simply repetitively depressing (i.e., clicking) a button. Applications and operating systems generally use "double clicking," for instance, to perform additional functions with a graphical user interface element. Some applications even respond to three or more successive clicks to perform different functions on a computer.

Determining what operation is desired by the user when clicking a pointing device button is often complicated by having several functions to distinguish. For example, some operating systems and applications allow for holding down a pointing device button to select an area of the screen or to "drag and drop" a GUI element. Similarly, a single click may simply highlight a GUI element and a double click may execute a function for the GUI element. Therefore, timing thresholds between button depressions and/or button transitions are generally used to determine which operation is desired. For example, two clicks which occur within a timing threshold may be deemed a double click, whereas two clicks occurring beyond the timing threshold may be deemed as two single clicks.

Fixed timing thresholds to distinguish button clicks tend to frustrate some users. A novice user or a physically impaired user may click too slowly, for example, to perform a double click operation. However, lengthening the duration of time in which a second click must occur in all instances in order to perform a double click would be inappropriate for the vast number of users, i.e., the user would have to wait for a longer period of time between desired single clicks to avoid an inadvertent double click and the user would find the GUI slower to respond to single clicks.

Fixed timing thresholds also may limit the choice of GUI pointing devices or software application suitable for certain operating systems and applications. Pointing devices such as used on a hand-held computer or a voice activated system may physically limit how quickly a double click may be performed.

The ability to adjust click timing thresholds for button monitoring of GUI pointing devices has generally required action by the user. In some operating systems, the user must, by trial and error, vary a timing setting in a GUI control panel. It has also been suggested that the user may be prompted to double click upon a dedicated GUI element displayed in a control panel whereupon the system adjusts the timing setting based upon the length of time required to execute two clicks.

Such adjustments are an inconvenience to the user and thus tend to be performed irregularly. Consequently, the GUI may be inappropriately set when switching between applications or when different users access the same GUI. For example, a parent may start a computer system and then allow a child to play a game. The parent prefers that the computer system remain set up primarily for himself; however, the child may find it difficult to double click quickly enough on elements of the game. Even the same user may change over time their interaction with the GUI, such as due to fatigue.

Therefore, a significant need exists for a less intrusive and more flexible manner of adjusting button monitoring of a graphical user interface pointing device.

SUMMARY OF THE INVENTION

The invention addresses these and other problems associated with the prior art in providing an apparatus, program product, and method in which a click time threshold, used to recognize subsequent click events on a graphical user interface in response to a user interacting with an application with a click event. More specifically, the actuations of a button of a user-manipulated pointing device are monitored. A click event is posted for the application when a predetermined number of button clicks occur within a click time threshold. In addition to this user interaction with the application, advantageously a duration of the predetermined number of button clicks is determined. Then, the click time threshold is adjusted responsive to the duration of the predetermined number of button clicks. Consequently, subsequent click events are recognized as appropriate to the usage.

In another aspect consistent with the invention, a stored click time value is associated with an application resident in memory so that, upon activation of the application, the click time threshold is initialized to the stored click time value.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Figure 1:
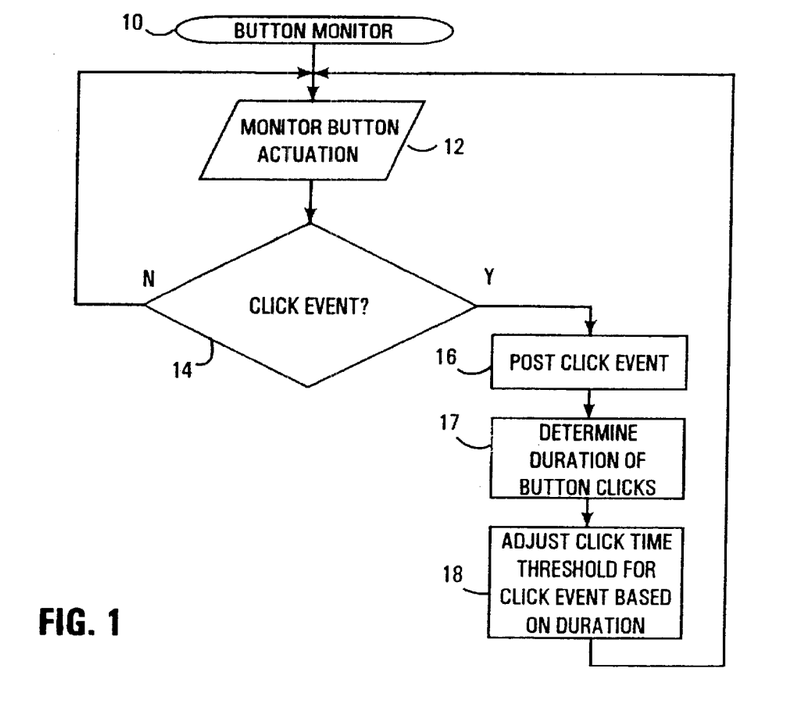
FIG. 1 is a flowchart illustrating a button monitor routine of a graphical user interface (GUI) consistent with the invention.

Turning to the Drawing, wherein like numbers denote like parts throughout the several views, referring to FIG. 1, a flowchart illustrates a button monitor routine 10 for monitoring a graphical user interface (GUI) button consistent with the invention. The button monitor routine 10 would typically be continuously operating, at least with respect to the perception of a user. Consequently, various iterative repetitions of the routine 10 may be employed, such as an interrupt-driven system in which a plurality of user interface prompts are handled by an operating system. As another example, a dedicated peripheral interface card may incorporate a button monitoring routine 10.

Button monitor routine 10 may generally be the default processing for a click event for interacting with an application via the graphical user interface. The button monitor routine 10 may be incorporated into the application or resident in an operating system used to interact with one or more applications. Having dynamic adjustment of recognition of a click event within the default button monitor routine 10 allows for non-intrusive customization of the graphical user interface while the user performs desired functions of the application.

It should be appreciated that applications include a wide variety of capabilities including word processing, calculations, information retrieval, information storage, simulations, games, etc. An application within the context of the invention, however, is not solely directed toward customizing the recognition of click events.

The button monitor routine 10 begins by monitoring a button for actuation (block 12). The actuation may include a transition from one discrete state to another, such as a button which is unactuated ("UP") being depressed to an actuated state ("DOWN"). Actuation may include a complete actuation cycle (i.e., button click), such as a button going from the "UP" position, to the "DOWN" position, and back to the "UP" position.

Once a button actuation has been detected in block 12, a determination is made as to whether a "click event" has occurred following the actuation of the button (block 14). The click event may include a single button click, a double button click, and/or some greater multiple ("Nth") button click, occurring within a recognition timing threshold for the click event. If a click event was recognized, then the click event is posted (block 16) for use by the graphical user interface for use by an application performing functions other than click time adjustment.

If in block 14 the button actuations were determined to be a click event and the click event was posted in block 16, then the duration of the predetermined number of button clicks is determined (block 17). Such data regarding the duration of the predetermined number of button clicks may be passed to the routine 10 or be determined by starting timers as will be discussed below for FIG. 6. Once the duration is determined in block 17, then the click time threshold for subsequent click events is adjusted responsive to the duration without necessarily requiring additional action by a user (block 18). Advantageously, the button monitor routine 10 iteratively returns to block 12 to continue monitoring button actuations or clicks.

The click time threshold may be adjusted by a plurality of predetermined number of button clicks. For example, a double click and a triple click may both affect the setting of the threshold. In addition, each of the plurality may be separately compared, such as a double click causes adjustment relative to whether its duration was more or less than half of the click time threshold, whereas a triple click causes adjustment relative to three quarters. Thus, a click rate for each of the plurality is determinative.

The click time threshold, moreover, may be a plurality of graduated thresholds, each assigned to a respective one of the plurality of predetermined number of button clicks. Thus, for instance, a double click would adjust a double click button monitor having a double click time threshold and a triple click would adjust a triple click monitor having a triple click time threshold.

In addition, separate threads may be performing the various actions described in FIG. 1. For example, a double click button monitor and a triple click monitor may each be performed by a separate thread. As another example, timing the duration of the predetermined number of button clicks and the adjustment of the click time threshold may be performed by separate threads, perhaps advantageously allowing for adjustment as a lower priority thread to maintain efficient GUI operation.

Advantageously, determination of whether a specific click event has occurred may advantageously filter out situations which do not warrant adjusting a click time threshold. For example, very brief or very long button actuations may be deemed inadvertent and thus be appropriately ignored by returning to block 12 to continue monitoring button actuations. Alternatively, adjustment of the click time threshold may be appropriate even if a click event has not occurred. For example, the duration of the button clicks may exceed the click time threshold by a relatively small amount and an increase in the click time threshold is performed, even though the click event is not posted. An implementation may include a determination, after an "N" from block 14, of whether the duration was within an adjustment threshold. If so, then processing proceeds to block 16, and if not, to block 12.

Figure 2:
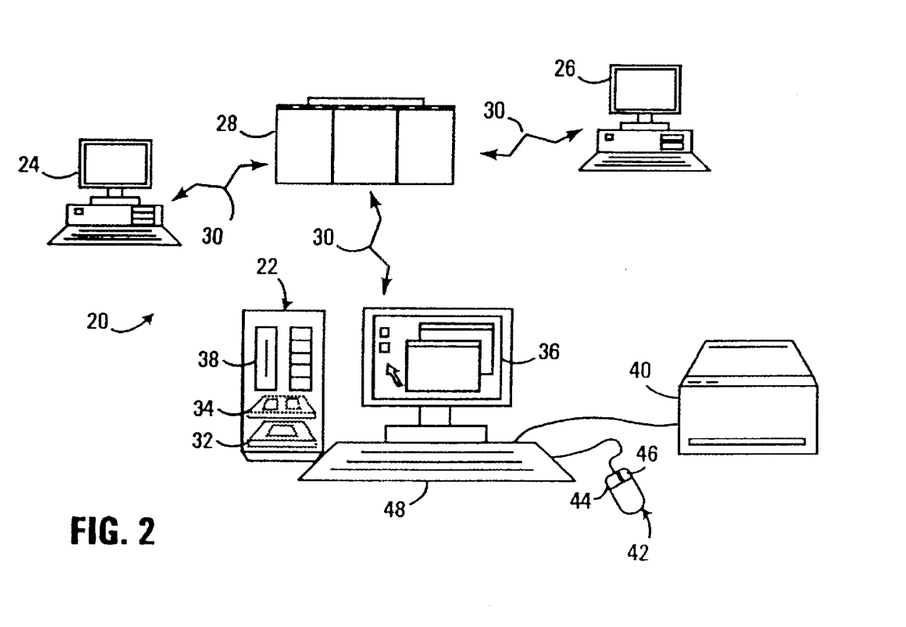
FIG. 2 is a block diagram of a computer system including dynamic click time threshold adjusting consistent with the invention.

Having introduced the concept of adjusting a click time threshold in conjunction with interacting with an application, an implementation in an illustrative hardware environment begins at FIG. 2, where a computer system 20 consistent with the invention is depicted in block diagram form. Computer system 20 is illustrated as a networked computer system including one or more client computer systems 22, 24 and 26 (e.g., desktop or personal computers, workstations, etc.) coupled to server system 28 through a network 30. Network 30 may represent practically any type of networked interconnection, including but not limited to local-area, wide-area, wireless, and public networks (e.g., the Internet). Moreover, any number of computers and other devices may be networked through network 30, e.g., multiple servers. Furthermore, it should be appreciated that the principles of the invention may be utilized as well by stand-alone computers and associated devices consistent with the invention.

Computer system 22, which may be similar to computer systems 24, 26, may include a processor such as a microprocessor 32; a memory 34; a number of peripheral components such as a computer display 36; storage devices 38 such as hard, floppy, and/or CD-ROM disk drives; a printer 40; a pointing device such as a mouse 42 including a left button 44 and right button 46; and a keyboard 48, among others. Computer system 22 operates under the control of an operating system, and executes various computer software applications, programs, objects, modules, etc. Moreover, various applications, programs, objects, modules, etc., may also execute on one or more processors in server 28 or other computer systems 24, 26, e.g., in a distributed computing environment.

Computer display 36 may include any known manner of visual, audio and/or tactile presentation of information to a user. For example, computer display 36 may be a video monitor, e.g. a cathode-ray tube (CRT), a liquid crystal display (LCD), or a projection display, among others. In addition, other types of computer displays, including two-dimensional displays that simulate three dimensions (e.g., virtual reality headsets), as well as three-dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's , DVD's , etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
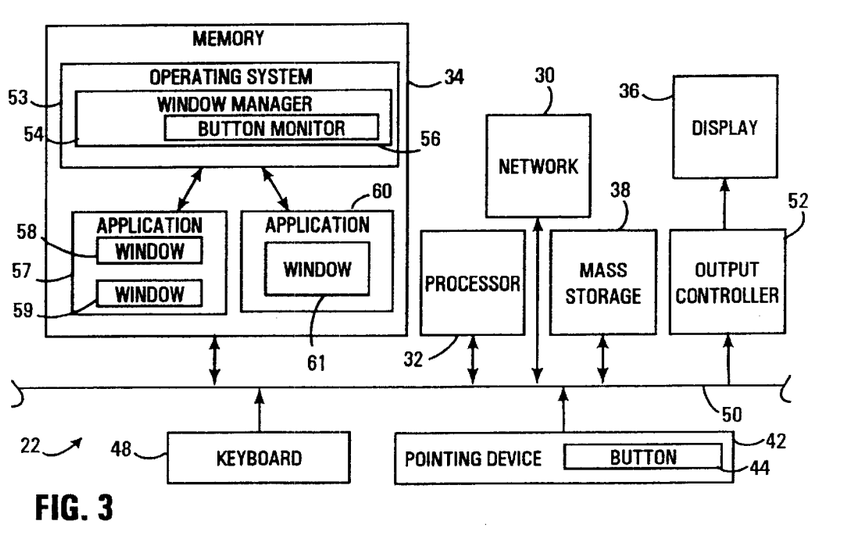
FIG. 3 is a block diagram of an exemplary software environment for the computer system of FIG. 2.

FIG. 3 illustrates a number of software components suitable for implementing click time threshold adjustment functionality in the computer system 22 consistent with the invention. Computer system 22 is typically under the control of an operating system 53 incorporating a window manager 54, shown as resident in memory 34. The window manager 54 is shown including a button monitor 56 operatively responsive to actuation of button 44. Window manager 54 generally provides, in conjunction with an output controller 52 controlling the display 36, an event-driven graphical user interface (GUI) environment for handling the display of information to, and the receipt of input from, a user. However, it should be appreciated that routines consistent with the invention may also find use in other processes than a window manager 54. For example, routines consistent with the invention may find use in various computer software applications that execute on top of an operating system, such as an application 57, including windows 58, 59, and an application 60 having a window 61.

It should be appreciated that the window manager 54 and button monitor 56 may be stored on network 30 or mass storage 38 prior to start-up. In addition, each may have various components that are resident at different times in any of memory 34, mass storage 38, network 30, or within registers and/or caches in processor 32 (e.g., during execution thereof). It should also be appreciated that other software environments may be utilized in the alternative.

Figure 4:
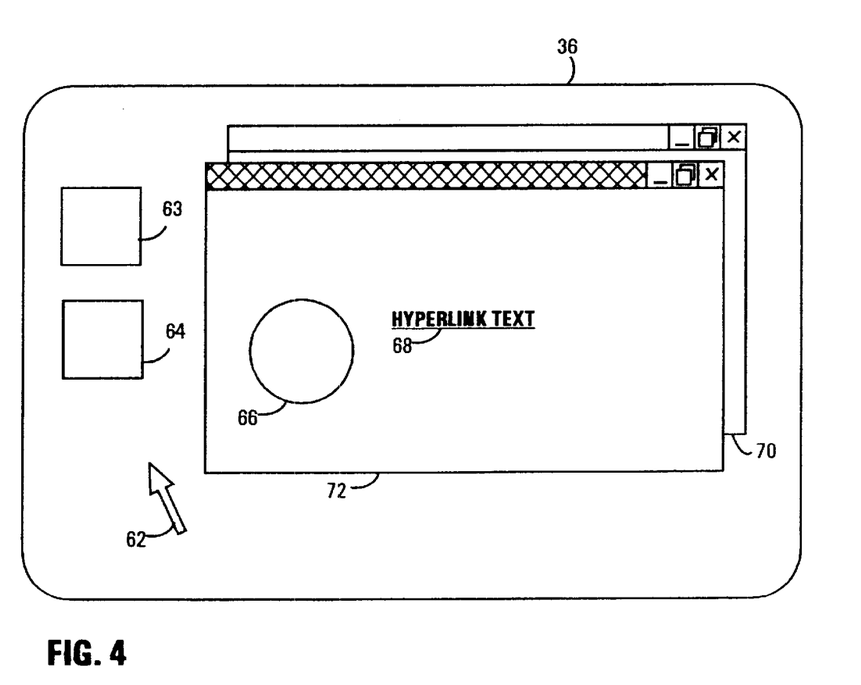
FIG. 4 is a depiction of a graphical user interface (GUI) displayed on a computer display of FIG. 2, including a pointing device-controlled pointer and a plurality of GUI elements such as icons and windows.

Referring to FIG. 4, a depiction of a graphical user interface (GUI) on the computer display 36 of FIG. 2 includes a pointing device controlled pointer 62 and a plurality of GUI elements such as icons 63, 64, 66, hyperlink text 68, and windows 70, 72. A user may position pointer 62 with pointing device 42 over one of the GUI elements 63–72 and then, for example, interact with a specific GUI element by double clicking button 44 of the pointing device 42.

Figure 5:
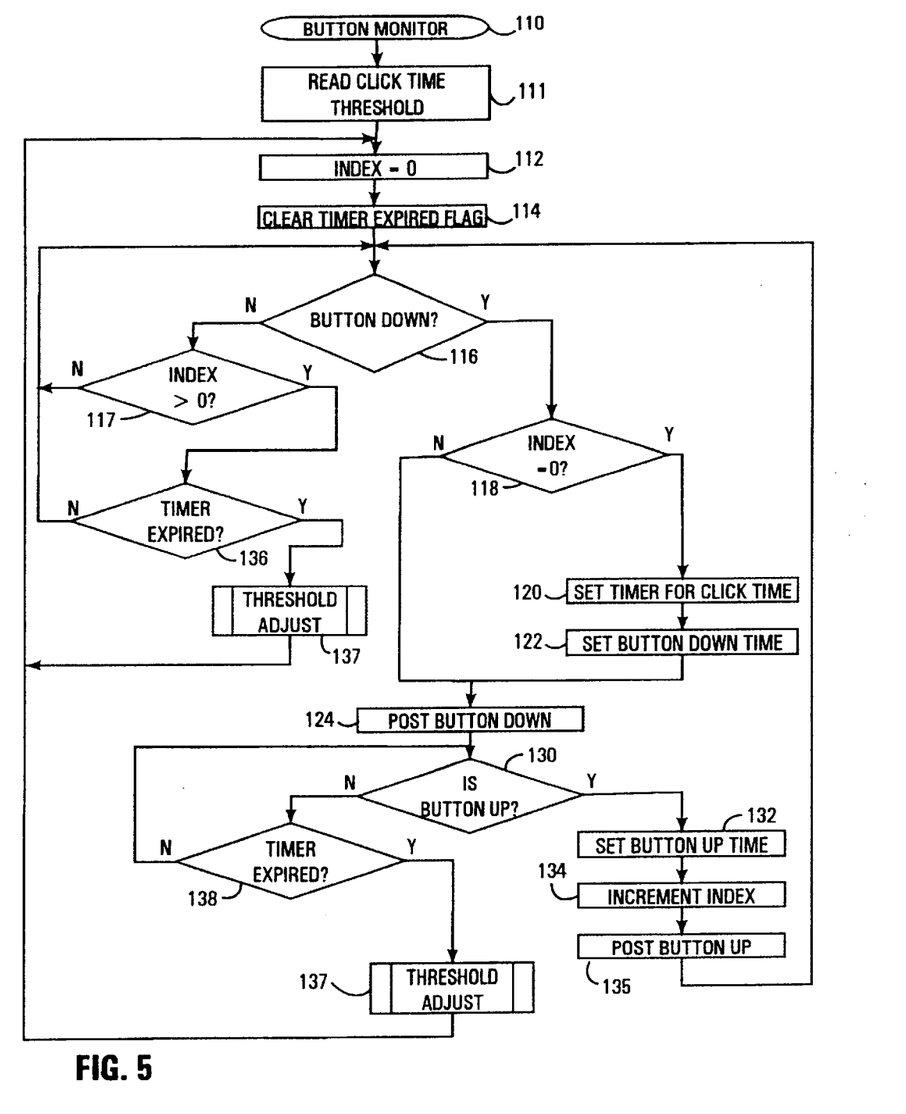
FIG. 5 is a flowchart illustrating the program flow of the button monitor routine of FIG. 3.

Referring to FIG. 5, a flowchart illustrates a button monitor routine 110 consistent with the invention, relying upon a Click Time (CT) threshold during which time a click event (e.g., a double click) must occur in order to be recognized. The button monitor routine 110 may be initialized with predefined values for a default Click Time (CT) threshold based on one or more conditions (e.g., historical usage by the user, a default associated with the application 57, 60, and/or user control selection made to the graphical user interface).

Button monitor routine 110 illustrates monitoring a plurality of combinations of button clicks, consequently, an index is set to 0 in block 112 for keeping track of the number of button clicks that occur in combination (e.g., single click, double click, triple click). Then a timer expired flag is cleared (block 114) since routine 110 shows use of a click timer whose expiration, as evidenced by the flag, triggers a click time threshold adjustment, as will be described below.

Once routine 110 is initialized in blocks 112, 114, a determination is made as to whether a click event has occurred within the click time threshold, and for what click time duration. For pointing devices 42 capable of having a button 44 that may be actuated for a variable period of time, such determination may entail monitoring when the button 44 is actuated ("DOWN") and when released ("UP"). Such pointing devices 42 may perform different functions, such as defining an area on the computer display 36 when the button 44 is held actuated while the pointer 62 is moved, as compared to the function of double clicking by relatively rapid button actuations with the pointer 62 left in relatively the same location. It would be apparent that such single click monitoring would be simplified by pointing devices 42 capable of only providing a click event and not a held down actuation.

Thus, after block 114, a determination is made as to whether the button 44 has been actuated by being pressed down (block 116). If the button is not down in block 116, then a determination is made as to whether at least one click has occurred warranting further processing for click time threshold adjusting (block 117). Thus, if the index is not greater than 0, then processing returns to block 116 awaiting a button actuation. Alternatively, such a determination would be inherent in an interrupt-driven button monitor (i.e., the routine 110 would not have been called if the button had not been actuated).

If the button is detected as being down in block 116, then a determination is made as to whether this is the first detection of the button actuation by determining whether the index is set to 0 (block 118). If the index is 0, then a timer is set for the Click Time (CT) threshold so that subsequent button clicks may be monitored (block 120). A plurality of timers may be set for implementations wherein a plurality of a predetermined number of button clicks are monitored, as would be apparent to those skilled in the art. For example, a click event may comprise two full clicks (double click) for a duration less than the click time (CT) threshold. As another example, a click event may include any one of a single click, a double click, or a triple click. Determining the actual duration of the predetermined number of button clicks is then begun by recording, or setting, the button Down Time (DT) (block 122), e.g., the system clock time when first pressed down. In some applications, the window manager 54 may act upon the button 44 transitioning to its down position; therefore, the button down condition is posted (block 124).

If the index was not equal to zero in block 118 or after block 124, the button monitor routine 110 waits for either the button to transition to the UP position or the timer to expire. Thus, at block 130, a determination is made as to whether the button is UP. If the button is detected as being up, the button Up Time (UT) is recorded, or set, so that the duration of the predetermined number of button clicks may be determined (block 132). For example, the system clock time when the button was last released to the up position. Then, the index is incremented to denote that a full click of the button 44 has been detected (block 134). For applications which act upon transitions in the button 44, the button up transition is then posted (block 135). Thereafter, routine 110 returns to block 116 to continue monitoring for additional full clicks of the button 44 within the Click Time (CT) threshold.

If at block 116 no button down is detected and the index was greater than 0 in block 117, then a determination is made as to whether the timer has expired (block 136), and if not, processing returns to block 116. However, if the timer has expired in block 136, then a threshold adjust routine 137 is performed based on click event duration as compared to the Click Time (CT) threshold. Block 137 may further include posting the click event, such as posting a double click. Then routine 110 would return to 112 to be reinitialized in preparation for the beginning of the next click event.

The timer may also expire while the button 44 is being held down, as is illustrated when a transition to the Up position of the button 44 has not been detected in block 130, wherein a determination is made as to whether the timer has expired in block 138. If the timer has expired, then a threshold adjust routine 137 is performed. Then routine 110 would return to 112 to be reinitialized in preparation for the beginning of the next click event. If the timer has not expired in block 138, then routine 110 continues waiting for the button to transition to the UP position by returning to block 130.

It should be appreciated that button monitoring functions such as area select and "drag and drop" may include additional recognition criteria such as movement of the pointer 62, etc. Consequently, additional logic may be included in button monitoring. For example, if the timer is expired in block 138, an additional determination may then be made as to whether the index=0. If so, monitoring waits for movement of the pointer 62 while the button 44 remains down to perform area select or drag and drop.

It should also be appreciated that rather than waiting for the timer to expire in block 136 or block 138, some applications may implement a limited number of full clicks which comprise a click event of interest. For example, double clicks are monitored but triple clicks are not. Consequently, once a second full click is detected (i.e., index=2) the click event duration may be established and threshold adjustment performed. Checking for index=2 in this instance may advantageously occur after the condition in block 138 is satisfied, and if found, processing would proceed to block 137.

It should further be appreciated that routine 110 may be directed toward adjusting the click time threshold based on the application. As an example, a longer duration click time threshold may be initialized in block 111 for a child's game, whereas a shorter duration click time threshold would be initialized for other applications. For instance, the parameters for click time adjustment may change to those associated with a window that gets focus and revert when the window loses focus. Moreover, no other threshold adjustment may occur (i.e., block 137 would not be preformed). Alternatively, in addition to initializing based on the application, the first click event interacting with the application may cause threshold adjustment as described for block 137. As a further alternative, threshold adjustment for a click time threshold based on the application may be dynamic, as described above.

Figure 6:
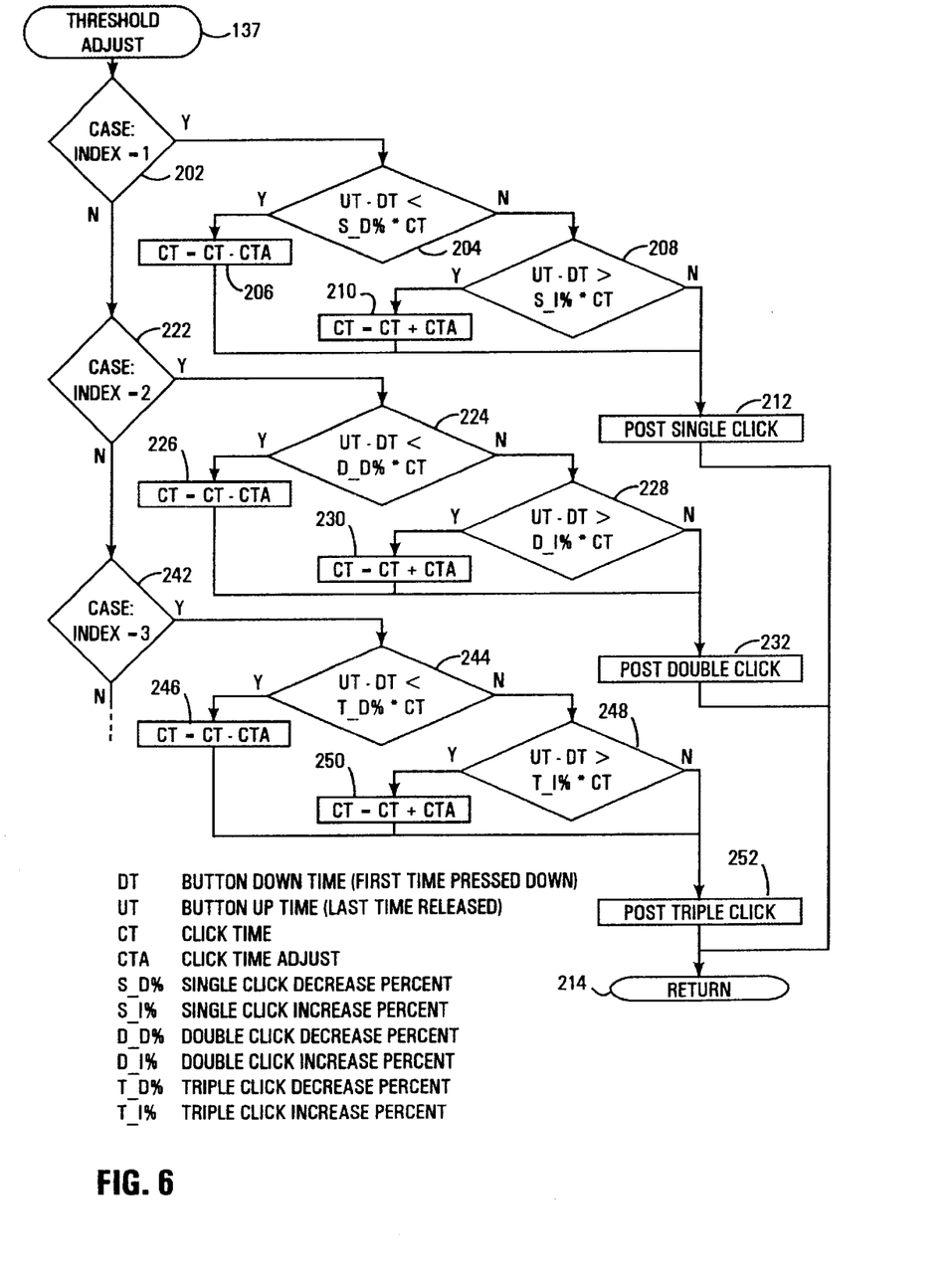
FIG. 6 is a flowchart illustrating the program flow of the threshold adjust routine of FIG. 5.

Referring to FIG. 6, a flowchart illustrates a threshold adjust routine 137 of a click time threshold for the button monitor routine 110 of FIG. 5. The threshold adjust routine 137 illustrates an adjustment of a Click Time (CT) threshold based on a single click event, double click event and a triple click event. Each type of click event has two comparison points, wherein being below the lower comparison point cause decrementing the click time threshold and being above the higher comparison point causes incrementing the click time threshold. It will be appreciated that posting of a click event may be limited to specific combinations of full clicks, such as only a single click or a double click. Moreover, adjustment of the Click Time (CT) threshold may be limited to a one or more specific combinations of full clicks, such as only for a double click will adjustments be performed, whereas postings are made for both single clicks and double clicks.

Since routine 137 illustrates posting and adjusting for single, double, and triple click events, a case determination is made as to the index value. In the case of the index being set to 1 (block 202), then in block 204 a determination is made as to whether the single click duration of Up Time (UT) minus Down Time (DT) is less than a single click decrease percent ("S_D %") of the Click Time (CT) threshold: "UT−DT<S_D %*CT." Thus, if in block 204 a single click event satisfies the condition by being of relatively shorter duration, then the Click Time (CT) threshold is decreased by a Click Time Adjust (CTA) value, which could be a fixed value (block 206). Alternatively, a scaling factor may be used, such as decreasing CT by 10%. However, if in block 204, the single click event did not satisfy the condition, then a determination is made in block 208 as to whether the duration of the single click event ("UT–DT") is greater than a threshold of a Single Click Increase Percent of the Click Time (CT) threshold ("S_I %*CT"). If the duration of the single click event is of relatively longer duration and satisfies the condition in block 208, then the Click Time (CT) threshold is increased by a Click Time Adjust (CTA) value (block 210). If the condition of block 208 is not satisfied or after the Click Time (CT) threshold is adjusted in blocks 206 or 210, a single click is posted (block 212) and routine 137 returns at block 214.

If the case determination of index=1 is not satisfied in block 202, then a case determination is made of whether index=2 in block 222. If satisfied, then a determination is made in block 224 as to whether the duration of the double click is less than a double click decrease percent of the click time threshold ("UT–DT<D_D%*CT"). If the condition is satisfied in block 224, then a Click Time (CT) threshold is decreased by a Click Time Adjust (CTA) in block 226. The Click Time (CT) threshold may be single value applicable to all combinations of clicks that comprise a click event or a specific Click Time (CT) threshold assigned to a double click event.

If the condition was not satisfied in block 224, then a determination is made in block 228 as to whether the duration of the double click was greater than a double click increase percent of the click time threshold ("UT–DT>D_I %*CT"), and if so, the Click Time (CT) threshold is increased by a Click Time Adjust (CTA) value in block 230. If the condition of block 228 is not satisfied or after the Click Time (CT) threshold is adjusted in blocks 226 or 230, a double click is posted (block 232) and routine 137 returns at block 214.

If the case determination of index=2 is not satisfied in block 222, then a case determination is made of whether index=3 in block 242. If satisfied, then a determination is made in block 244 as to whether the duration of the triple click is less than a triple click decrease percent of the click time threshold ("UT–DT<T_D %*CT"). If the condition is satisfied in block 244, then a Click Time (CT) threshold is decreased by a Click Time Adjust (CTA) in block 246.

If the condition was not satisfied in block 244, then a determination is made in block 248 as to whether the duration of the triple click was greater than a triple click increase percent of the click time threshold ("UT–DT>T_I %*CT"), and if so, the Click Time (CT) threshold is increased by a Click Time Adjust (CTA) value in block 250. If the condition of block 248 is not satisfied or after the Click Time is adjusted in blocks 246 or 250, a triple click is posted (block 252) and routine 137 returns at block 214.

It should be appreciated that various amounts of adjustment may be appropriate. As an example, the threshold adjust routine 137 uses a first fraction (e.g., S_D %, D_D %, T_D%) of the Click Time (CT) threshold for a determination to decrement the Click Time (CT) threshold, and a second fraction (e.g., S_I %, D_I %, T_I %) of the Click Time (CT) threshold for a determination to increment the Click Time (CT) threshold. It would be apparent that the adjustment may be performed in a number of ways, including varying the amount of adjustment in proportion to the deviation from some value. Thus, the Click Time (CT) threshold would adjust more rapidly to the user. Also, the two thresholds for either incrementing or decrementing the Click Time (CT) threshold may be the same, without having a range between the thresholds wherein no adjustment is made.

As a further example, the button monitor routine 110 may perform threshold adjust routine 137 for specific conditions, rather than being continuously active. For instance, some applications may not utilize pointer inputs and thus adjustment is unwarranted. Additional processing capacity would thus be available if click time adjustment was suspended. Some applications, such as games, may utilize pointer inputs in a time critical fashion where adjustment is also unwarranted.

As yet a further example, the range of values to which the Click Time (CT) threshold can be adjusted may be limited, preventing an extraordinarily short or long click time threshold. Moreover, the limits to click time threshold adjustment may be set by a user or computer system 22.

As an additional example, the click time threshold may be adjusted from a default click time threshold for a limited period of time. For example, the button monitor routine may be reinitialized to a default click time threshold after a predetermined period of GUI inactivity, in addition to, or as an alternative to, initializing the click time threshold upon starting the graphical user interface, interacting with an application, or upon a user control selection regarding button monitoring.

As a further example, the predetermined second fraction of the click time threshold used to determine when to increase the click time threshold may be larger than 100%. Consequently, a predetermined number of button clicks may have a duration that is above the current click time threshold and thus not be posted as a click event. However, the duration of the button clicks may fall within the range where the click time threshold is increased for subsequent click events.

Other various additional modifications may be made to the embodiments described herein without departing from the spirit and scope of the invention. Therefore, the invention lies in the claims hereinafter appended.

What is claimed is:

1. A method of dynamically interacting with an application via a graphical user interface using a user-manipulated pointing device adapted to signal a button click, the method comprising:

monitoring button clicks signaled by the user-manipulated pointing device;

posting a click event for the application when a predetermined number of button clicks occur within a click time threshold;

determining a duration of the predetermined number of button clicks; and adjusting recognition of subsequent click events by automatically varying the click time threshold responsive to the duration of the predetermined number of button clicks.

2. The method of claim 1, wherein the predetermined number of button clicks is two.

3. The method of claim 1, wherein varying the click time threshold includes decreasing the click time threshold by a click time adjust value when the duration of the predetermined number of button clicks is less than a predetermined first fraction of the click time threshold, and includes increasing the click time threshold by a click time adjust value when the duration of the predetermined number of button clicks is greater than a predetermined second fraction of the click time threshold, the first fraction being less than or equal to the second fraction.

4. The method of claim 1, wherein varying the click time threshold responsive to the duration of the predetermined number of button clicks includes limiting the variation in the click time threshold to a click time range.

5. The method of claim 1, wherein determining the duration of the predetermined number of button clicks includes starting a timer upon detecting an actuation of the button, and wherein posting a click event when the predetermined number of button clicks occur within the click time threshold includes counting a button click with each release of the button until the timer expires at the click time threshold.

6. The method of claim 1, further comprising initializing the click time threshold with a stored click time value.

7. The method of claim 6, wherein the stored click time value is associated with a historical usage of a user.

8. The method of claim 6, wherein the stored click time value is associated with an active window of the graphical user interface.

9. The method of claim 6, wherein the stored click time value is associated with a user control selection of the graphical user interface.

10. An apparatus comprising:
   (a) a user-manipulated pointing device including a button adapted to signal a button click;
   (b) a memory;
   (c) an application, resident in memory, the application configured to respond to a click event; and
   (d) a program, resident in memory, the program configured to monitor button clicks of the user-manipulated pointing device, to post a click event for the application when a predetermined number of button clicks occur within a click time threshold, to determine a duration of the predetermined number of button clicks, and to adjust recognition of subsequent click events by automatically varying the click time threshold responsive to the duration of the predetermined number of button clicks.

11. The apparatus of claim 10, wherein the predetermined number of button clicks is two.

12. The apparatus of claim 10, wherein the program is configured to vary the click time threshold by decreasing the click time threshold by a click time adjust value when the duration of the predetermined number of button clicks is less than a predetermined first fraction of the click time threshold, and by increasing the click time threshold by a click time adjust value when the duration of the predetermined number of button clicks is greater than a predetermined second fraction of the click time threshold, the first fraction being less than or equal to the second fraction.

13. The apparatus of claim 10, wherein the program is further configured to vary the click time threshold within a click time range.

14. The apparatus of claim 10, wherein the program is configured to determine the duration of the predetermined number of button clicks by starting a timer upon detecting an actuation of the button, and wherein the program is configured to post the click event for the application when a predetermined number of button clicks occur within a click time threshold by counting a button click with each release of the button until the timer expires at the click time threshold.

15. The apparatus of claim 10, wherein the program is further configured to initialize the click time threshold with a stored click time value associated with a historical usage of a user.

16. The apparatus of claim 10, wherein the program is further configured to initialize the click time threshold with a stored click time value associated with an application.

17. The apparatus of claim 10, wherein the program is further configured to initialize the click time threshold with a stored click time value associated with a user control selection of the graphical user interface.

18. A program product, comprising:
   (a) a program, configured to monitor button clicks of the user-manipulated pointing device, to post a click event for the application when a predetermined number of button clicks occur within a click time threshold, to determine a duration of the predetermined number of button clicks, and to adjust recognition of subsequent click events by automatically varying the click time threshold responsive to the duration of the predetermined number of button clicks; and
   (b) a signal bearing media bearing the program.

19. The program product of claim 18, wherein the signal bearing media is one of a transmission type media and a recordable media.

20. An apparatus comprising:
   (a) a user-manipulated pointing device including a button adapted to signal a button click;
   (b) a memory;
   (c) an application, resident in memory, the application configured to respond to a click event;
   (d) a stored click time value associated with the application; and
   (e) a program, resident in memory, the program configured to initialize a click time threshold with the stored click time value in response to an activation of the application, wherein the program is further configured to monitor button clicks of the user-manipulated pointing device, to post a click event for the application when a predetermined number of button clicks occur within a click time threshold, to determine a duration of the predetermined number of button clicks, and to adjust recognition of subsequent click events by automatically varying the click time threshold responsive to the duration of the predetermined number of button clicks.

21. The apparatus of claim 20, further comprising a default stored click time value of shorter duration than the stored click time value associated with the application, and wherein the application comprises a child application, and wherein the program is further configured to automatically initialize the click time threshold to the default stored click time value in response to the deactivation of the child application.

* * * * *